United States Patent Office 2,927,093
Patented Mar. 1, 1960

2,927,093
COMPOSITION COMPRISING VINYL CHLORIDE RESIN, COPOLYMER OF BUTADIENE AND ACRYLONITRILE, AND THE PRODUCT OBTAINED BY POLYMERIZING BUTADIENE IN THE PRESENCE OF A COPOLYMER OF ACRYLONITRILE AND STYRENE

Wesley Marion Germon, Cuyahoga Falls, Ohio, assignor to The Goodyear Tire & Rubber Company, Akron, Ohio, a corporation of Ohio No Drawing. Application August 2, 1957
Serial No. 675,824
10 Claims. (Cl. 260—31.6)

This invention relates to a three-component blend of polymeric materials, and more particularly, to compositions comprising an improved thermoplastic tripolymer "piggy back" resin plasticized with a "dead" butadiene-acrylonitrile rubbery copolymer and reinforced with vinyl chloride resin.

A flexible material suitable, for example, in the manufacture of automotive crash pad sheeting used on the instrument panel area of an automobile must have such properties as tensile strength, elongation, tear strength, hardness, processability, embossability, post formability, resistance to embrittlement, resistance to outdoor aging and resistance to the more common solvents. Combinations of a rubber and a resin produce certain of these requirements and combinations of a specific rubber, such as the well-known oil-resistant rubbery copolymers of butadiene and acrylonitrile with certain resins also produce certain of these properties and even combinations of two different rubbers with one other resin have developed a wide variety of properties, but none heretofore have developed all the properties desired in a flexible material of the kind described.

Accordingly, it is an object of this invention to provide an improved three-component polymeric composition suitable for use as a leather-like material in the manufacture of automobile crash pad sheeting and the like.

Another object is to provide such compositions based upon a blend of a rubbery component and at least two resinous components.

Still another object is to provide such compositions which will have desirable tensile strength, elongation, resistance to tear, hardness, embossability, post formability, resistance to embrittlement, resistance to outdoor aging and resistance to the more common solvents.

It has been discovered that such a composition may be prepared by plasticizing a "piggy back" tripolymeric thermoplastic resin with a "dead" rubbery copolymer of butadiene/acrylonitrile and reinforcing this plasticized resin with a plasticized vinyl chloride resin, each in amounts relative to each other sufficient to develop the various properties required to the degree desired.

The "piggy back" thermoplastic resinous tripolymer component of this blend is made by polymerizing styrene or a styrene homologue, such as alpha-methyl styrene, para-methyl styrene, alpha-methyl para-methyl styrene and nuclearly chlorinated styrenes, such as 2-chloro styrene, 4-chloro styrene and 2,4-dichloro styrene with acrylonitrile to which polymeric reaction mixture is added a diene hydrocarbon monomer such as butadiene, which added monomer is then polymerized to completion in the presence of this polymeric reaction mixture.

The styrene and acrylonitrile monomers may be reacted in emulsion in the presence of a free radical producing catalyst, and an emulsifier at a temperature sufficient to bring about the reaction of the two monomers for a period of time sufficient to get the desired conversion of the monomers to a polymeric product. To this latex reaction product is then added the diene hydrocarbon and the polymerization contained at a temperature sufficient to cause polymerization of the diene hydrocarbon monomer to completion. The final reaction product may then be isolated by coagulation, filtered, washed and dried. Such products are referred to in this invention as "piggy back" resins. The properties of these "piggy back" resins are different from the properties of a resin prepared by first reacting the styrene monomer with the acrylonitrile monomer, and then physically blending the resulting resinous copolymer with polybutadiene, which polybutadiene has been prepared separately. For example, when 25 parts of butadiene monomer is polymerized in the presence of the copolymer resulting from the reaction to completion of 50 parts of styrene in the presence of 25 parts of acrylonitrile in emulsion in the presence of a free radical catalyst, the resulting resin had a notched impact resistance of 11.5 ft. lbs., whereas a latex blend of 25 parts of polybutadiene with 75 parts of the resin copolymer resulting from the polymerization of 70 parts of styrene and 30 parts of acrylonitrile made under the same conditions of polymerization as described for the "piggy back" resin had a notched impact resistance of 0.37 ft. lbs.

The styrene/acrylonitrile resinous copolymer portion of the "piggy back" resin is made using from 50 to 80 weight percent of the styrene component and from 50 to 20 weight percent of the acrylonitrile and it is preferred to use 66% of the styrene component and 34% of the acrylonitrile component. The diene hydrocarbon component polymerized in the presence of the styrene/acrylonitrile resinous copolymer may be present in amounts from 15 percent by weight to 75 percent by weight and it is preferred to use about 25 percent by weight based upon the total monomers used in preparing the "piggy back" tripolymeric thermoplastic resin.

A specific "piggy back" resin used in the impact-resistant composition of this invention was made by charging a glass-lined reactor with a buffer solution comprising 180 parts of water, 4 parts of an alkyl benzene sodium sulfonate soap emulsifier commonly known by the trade name Naccanol NRSF, 0.4 part of trisodium phosphate, and 0.3 part of potassium persulfate as the catalyst followed by a monomer reactant charge comprising 55 parts of styrene, 0.125 part of tertiary dodecyl mercaptan and 20 parts of acrylonitrile. The reactor was then charged with nitrogen under 5 lbs. pressure. After the reactor and its contents had been subjected to a temperature of 115° F. for a time sufficient to polymerize the monomers to the desired conversion, 25 parts of butadiene-1,3 was added to the reactor under pressure and the contents of the reactor heated at 135° F. for 18 hours, the time needed to complete the polymerization of the butadiene in the presence of the copolymer of styrene and acrylonitrile. The contents of the reactor was stirred during heating. The latex resulting from the polymerization of the various monomers was protected against oxidation with the antioxidant, phenyl beta naphthylamine, and the product was isolated by spraying the latex into a heated chamber where the water was flashed off as vapor and the solid resin recovered. The resulting "piggy back" resin had a tensile strength of 3460 lbs., an elongation of 41%, a Shore D hardness of 73, a heat distortion temperature of 219° F., a stiffness of 165,000 p.s.i., and an Izod notched impact resistance at 77° F. of 11.5 ft. lbs./inch of notch. The heat distortion point of the resin is determined by the ASTM method identified as D648–45T, using a deflection pressure of 66 p.s.i.

All parts used throughout the disclosure are by weight unless otherwise indicated.

The "piggy back" thermoplastic resinous tripolymeric component of the blend of this invention is plasticized with a rubbery butadiene/acrylonitrile copolymer commercially known by various names such as Buna-A, GR-A, or Chemigum which is sold under various trade numbers such as Chemigum N3 by the Goodyear Tire & Rubber Company, of Akron, Ohio. A conventional formulation for manufacturing a rubbery polymer of butadiene and acrylonitrile is:

| Ingredients: | Parts by weight |
|---|---|
| Water | 180–375 |
| Peroxidic free radical catalyst | 0.1–0.50 |
| Butadiene-1,3 | 85–50 |
| Acrylonitrile | 15–50 |
| Emulsifying agent | 3.0–5.0 |
| Mercaptan modifier | .05–1.0 |

A specific embodiment of the above formulation in the manufacture of a "dead" rubbery copolymer of butadiene and acrylonitrile used as a plasticizer for the "piggy back" resin of the three-component impact resistant blend of this invention was made by charging a glass-lined reactor with a buffer solution containing 200 parts of water, 0.5 part of trisodium phosphate, 0.5 part of Naccanol NRSF, 2.5 parts of Tamol N (sodium alkyl aryl sulfonate), and 0.2 part of potassium persulfate as the catalyst followed by a charge comprising 33 parts of acrylonitrile, 0.2 part of divinyl benzene, and 0.6 part of tertiary dodecyl mercaptan together with a charge of 67 parts of butadiene-1,3, which charged reactor is then heated at 100° F. for a period of time sufficient to convert the monomers to 37% solids representing completion of the reaction. The resulting butadiene/acrylonitrile rubbery latex is coagulated with magnesium sulphate and short stopped with 0.2 part of sodium dimethyldithiocarbamate and protected with an antioxidant and then washed, dried and recovered. The resulting rubber had a methyl ethyl ketone insoluble gel content of 75%, which gel in turn had a swelling index of 25 determined in methyl ethyl ketone and a Mooney viscosity of 65 determined at 212° F. Although the use of the "dead" butadiene/acrylonitrile rubbery copolymer is preferred in the blend of this invention since the rubber has less "nerve" or less resistance to flow into a smooth sheet than "live" or more "nervy" butadiene/acrylonitrile rubbery copolymers the more "nervy" butadiene/acrylonitrile rubbery copolymers may be used in this blend because of the presence of the vinyl chloride resin. The gel content, as defined above of the "dead" rubber may range from 68% to 85% and as low as 62% when the "dead" rubber is made in the presence of a cross-linking agent such as divinyl benzene.

The butadiene-1,3 component of the rubbery copolymer may be used in amounts from about 50 to 80% and the acrylonitrile component may be used in amounts from 20 to 50 parts each based by weight on 100 parts of reacting monomer. It is preferred to use 33% acrylonitrile and 67% of butadiene-1,3.

The vinyl resin component of the three-component impact-resistant composition of this invention may comprise any vinyl resin, the major proportion of which is made with vinyl chloride and the minor proportion of which is made up of another copolymerizable monomer such as vinyl acetate or vinylidene chloride. Copolymers containing from 5 to 15% vinyl acetate, vinylidene chloride or other suitable copolymerizable monomers may also be used. The vinyl resin component of the blend of this invention functions with the butadiene/acrylonitrile rubbery copolymer, the plasticized "piggy back" styrene/acrylonitrile/butadiene tripolymer, as a reinforcing agent and under certain conditions of compounding as a compatibilizing agent, as well as contributing to the flexibility of the end compound and the resistance of the end compound to abrasion. Prior to blending of the vinyl resin with the other two components of the three-component blend, the resin may be compounded with various stabilizers and plasticizers in order to improve the aging properties of the vinyl resin and the various physical properties of the resulting blend.

A representative compounding formula for a vinyl chloride resin useful in the blend of this invention is:

| Ingredients: | Amounts |
|---|---|
| Poly(vinyl chloride) | 100 |
| Light and/or heat stabilizer | .05 to 5.0 |
| Plasticizer | 0 to 75 |
| Coloring matter | 0 to 4 |
| Filler | 0 to 50 |

The various compounding ingredients of this formula are banded on a hot mill together with the poly(vinyl chloride) until a fused homogeneous mixture of the various components is obtained. Mill temperatures of 270° F. to 350° F. may be used.

Any suitable plasticizer may be used including liquid as well as resinous plasticizers, specific plasticizers being tricresyl phosphate, dibutyl sebacate and the polymeric plasticizers well known in the trade, such as Paraplex G25, –G40, –G50, –G53, –G60, –G62 etc. as described in a pamphlet published August 1954 by Rohm & Haas Company, Washing Square, Philadelphia 5, Pennsylvania, and entitled "Here's What You Should Know About Paraplex and Monoplex Plasticizers."

The blending of the three components described hereinbefore may be done either in the latex form or in the solid form in any suitable mixing equipment, such as on an open rubber mill or in a closed mill, such as a Banbury. The blending of these components may be made in the solid state by first banding the vinyl resin compound of the blend on an open mill and then adding the rubber component until a homogeneous blend has been made of the two components and then adding the "piggy back" resin component and continuing the milling until a homogeneous blend of the three components has been obtained at a temperature of about 300° F. Compounding ingredients, such as fillers, antioxidants, stabilizers, plasticizers, coloring matter, etc. in any conventional and well-known manner may be added. It is desirable to have the stabilizer for the vinyl resin in the vinyl resin before blending it with the other components. These compounding ingredients may also be added to either of the three components separately prior to the blending of these three components with each other. It is desirable in producing the end blend to bring about the mixing of the various components in such a manner as to reduce the time required to bring about the blending of these various ingredients with the least amount of energy and degradation to the components as they are blended under heat and pressure.

A typical formulation of the composition of this invention is shown in the following example:

*Example 1*

| Ingredients: | | |
|---|---|---|
| Poly(vinyl chloride) | parts by weight | 20 |
| "Piggy back" resin | do | 40 |
| "Dead" rubber | do | 40 |
| Plasticizer (Paraplex G53) | do | 10 |
| Physical properties: | | |
| Tensile | p.s.i | 1960 |
| Elongation | percent | 313 |
| 100% modulus | p.s.i | 1125 |
| Graves tear | p.s.i | 399 |
| Hardness (Shore D) | | 57 |

The blend of this formulation was prepared by first forming a dry mix of 100 parts of the poly(vinyl chloride) with 50 parts of the plasticizer, Paraplex G53, which is a linear polyester of an aliphatic dicarboxylic acid and a glycol having an average molecular weight of 3380, and then adding the "piggy back" resin, prepared as described before, and the "dead" rubber, prepared as described before, all in a Banbury mixer heated to a temperature of 300° F. The blending of the ingredients is readily accomplished in a very short period of time depending, of course, upon the quantity being blended. The resulting blend is then calendered at about 310° F. into a sheet having a gauge of 0.025" and appropriate samples cut from this sheet for determining its physical properties.

The following blends were also made in the manner described for Example 1:

| Example | Ingredients | | | |
|---|---|---|---|---|
| | "Dead" rubber | Vinyl chloride resin | "Piggy back" resin | Plasticizer |
| 2 | 15 | 17 | 68 | 15 |
| 3 | 15 | 68 | 17 | 20 |
| 4 | 22 | 33 | 45 | 11 |
| 5 | 22 | 45 | 33 | 14 |
| 6 | 22 | 33 | 45 | 22 |
| 7 | 33 | 45 | 22 | 14 |
| 8 | 45 | 22 | 33 | 7 |
| 9 | 45 | 22 | 33 | 14 |
| 10 | 45 | 33 | 22 | 11 |
| 11 | 45 | 33 | 22 | 22 |
| 12 | 50 | 40 | 10 | 0 |
| 13 | 50 | 10 | 40 | 0 |

| Example | Physical Properties | | | | |
|---|---|---|---|---|---|
| | Tensile (p.s.i.) | Elongation (percent) | 100% modulus (p.s.i.) | Graves Tear (p.s.i.) | Hardness (Shore D) |
| 2 | 2,320 | 253 | 1,500 | 435 | 62 |
| 3 | 2,707 | 333 | 1,400 | 500 | 59 |
| 4 | 1,755 | 133 | 1,663 | 421 | 61 |
| 5 | 1,890 | 165 | 1,890 | 453 | 58 |
| 6 | 1,665 | 250 | 1,085 | 391 | 53 |
| 7 | 2,060 | 257 | 1,130 | 468 | 51 |
| 8 | 1,755 | 293 | 993 | 392 | 48 |
| 9 | 1,353 | 337 | 611 | 291 | 44 |
| 10 | 1,583 | 287 | 806 | 356 | 42 |
| 11 | 1,235 | 333 | 473 | 243 | 36 |
| 12 | 2,200 | 433 | 900 | 388 | 48 |
| 13 | 1,410 | 433 | 600 | 225 | 42 |

In each of the foregoing examples, the same vinyl resin, "piggy back" resin and "dead" rubber was used as was used in Example 1, the preparation of each of which was disclosed hereinbefore. The plasticizer in each case was the same polymeric plasticizer used in Example 1.

In each of the 13 examples above, the resulting blend is best adapted for the formation of a flexible sheet material useful as a skin in the manufacture of automobile crash pads, which are embossed with a desired design formed to the shape of the dash panel of the automobile at a temperature of about 125° F., partially filled with a resilient sponge material such as foamed rubber or foamed polyester resin and fastened in place over the dash panel as a cushion against impact.

When it is desired to make the flexible sheet material of this invention, it is preferred to use 33⅓% of each of the components based on the total amount of the three components used.

The butadiene/acrylonitrile rubber component may be used in amounts from 15 to 50% based on the total amount of the three components used. However, when more than 50% is used, the compound develops the undesirable characteristic of uncured rubber sheet, that is it becomes tacky and stretchy without sufficient rebound properties. The vinyl resin component may be used in amounts from 20 to 80% based on the total amount of the vinyl resin and the "piggy back" resin used. The use of greater than 80% of the vinyl resin causes the compound to take on the undesirable properties of the vinyl resin, that is, it becomes stiff or boardy and difficult to emboss and post form. The "piggy back" resin may be used in amounts from 20 to 80% based on the total amount of the vinyl resin and "piggy back" resin component used. Greater than 80% causes the blend to become too stiff and may not be classed as a flexible material.

While certain representative embodiments and details have been shown for the purpose of illustrating the invention, it will be apparent to those skilled in this art that various changes and modifications may be made therein without departing from the spirit or scope of the invention.

What I claim is:

1. A composition comprising (A) a vinyl chloride resin obtained by the polymerization of a major amount of vinyl chloride, (B) a rubbery copolymer resulting from the polymerization of a mixture containing 85 to 50 parts of butadiene-1,3 and 15 to 50 parts of acrylonitrile and (C) a resin resulting from the polymerization of (D) butadiene-1,3 in the presence of (E) a copolymer of acrylonitrile and a monomer copolymerizable with acrylonitrile selected from the group consisting of styrene and a styrene homologue, (A) and (C) each being present in an amount of from 20 to 80% by weight based on the total amount of (A) and (C) present, (B) being present in an amount from 15 to 50% by weight based on the total amount of (A), (B) and (C) present, (D) being present in an amount of from 15 to 75% by weight based on the total amount of monomers used in making (C) and acrylonitrile used in making (E) being present in amounts of from 50 to 20% by weight based on the total monomers used in making (E).

2. The composition of claim 1 in which (E) is a copolymer of acrylonitrile and styrene.

3. The composition of claim 1 in which (A) is a plasticized poly(vinyl chloride).

4. The composition of claim 3 in which the poly (vinyl chloride) is plasticized with up to 75 parts per 100 parts of poly(vinyl chloride) of a resinous plasticizer.

5. The composition of claim 1 in which (B) is a rubbery copolymer of butadiene-1,3 and acrylonitrile having a methyl ethyl ketone-insoluble gel content of from 62 to 85%.

6. The composition of claim 5 in which (B) has a methyl ethyl ketone-insoluble gel content of 75%.

7. The composition of claim 1 in which the acrylonitrile used in making (E) is present in an amount of 27% by weight based on the total monomers used in making (E).

8. The composition of claim 7 in which the butadiene-1,3 used in making (C) is present in an amount of 33⅓% by weight based on the total monomers used in making (C).

9. A composition comprising 20 parts of poly(vinyl chloride) obtained by the polymerization of a major amount of a vinyl chloride, 40 parts of a rubbery copolymer resulting from the polymerization of a mixture containing 85 to 50 parts of butadiene-1,3 and 15 to 50 parts of acrylonitrile, and 40 parts of a resin resulting from polymerization of (D) butadiene-1,3 in the presence of (E) a copolymer of acrylonitrile and a monomer copolymerizable with acrylonitrile selected from the group consisting of styrene and a styrene homologue (D) being present in an amount of 15 to 75% by weight based on the total amount of monomers used in making the resin, and the acrylonitrile used in making (E) being present in amounts of from 20 to 50% by weight based on the total monomers used in making (E).

10. The composition of claim 9 in which (B) is a rubbery copolymer of butadiene-1,3 and acrylonitrile having a methyl ethyl ketone-insoluble gel content of 75%.

References Cited in the file of this patent

UNITED STATES PATENTS

| 2,614,094 | Wheelock | Oct. 14, 1952 |
| 2,802,808 | Hayes | Aug. 13, 1957 |

FOREIGN PATENTS

| 649,166 | Great Britain | Jan. 17, 1951 |